US009832285B2

(12) United States Patent
Fujiwara et al.

(10) Patent No.: US 9,832,285 B2
(45) Date of Patent: *Nov. 28, 2017

(54) AUTOMATING USER'S OPERATIONS

(71) Applicant: International Business Machines Corporation, Armonk, NY (US)

(72) Inventors: Yayoi Fujiwara, Kanagawa-ken (JP); Yasuhisa Gotoh, Kanagawa-ken (JP); Yasutomo Nakayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,367

(22) Filed: Apr. 19, 2016

(65) Prior Publication Data

US 2016/0234347 A1 Aug. 11, 2016

Related U.S. Application Data

(63) Continuation of application No. 12/234,769, filed on Sep. 22, 2008, now Pat. No. 9,355,059.

(30) Foreign Application Priority Data

Sep. 28, 2007 (JP) ................................ 2007-255952

(51) Int. Cl.
*G06F 15/16* (2006.01)
*H04L 29/06* (2006.01)
(Continued)

(52) U.S. Cl.
CPC .......... *H04L 67/42* (2013.01); *G06F 3/04817* (2013.01); *G06F 3/04842* (2013.01); *G06F 15/16* (2013.01); *H04L 67/22* (2013.01)

(58) Field of Classification Search
CPC ...................................................... H04L 67/42
See application file for complete search history.

(56) References Cited

U.S. PATENT DOCUMENTS 5,167,010 A 11/1992 Elm et al.
5,748,499 A 5/1998 Trueblood
(Continued)

FOREIGN PATENT DOCUMENTS

JP H0371340 A 3/1991
JP H07334644 A 12/1995
(Continued)

OTHER PUBLICATIONS

Office Action for U.S. Appl. No. 12/234,769, dated Jun. 3, 2010, 21 pages, U.S. Patent and Trademark Office.
(Continued)

*Primary Examiner* — Hua Fan
(74) *Attorney, Agent, or Firm* — Jordan IP Law, LLC

(57) ABSTRACT

To select a communication sequence for automating user's operations, a system performing a user's operation is provided, which acquires and stores a communication history of a client with a server in receipt of a user's operation; accesses the storage to detect from the history a plurality of communication sequences that cause the same screen transition on the client; accesses the storage to select an input parameter that is included in all of the plurality of communication sequences and that has a parameter value changed for each communication sequence; accepts an input of a new parameter value to be set as a value of the selected input parameter; and sets the new parameter value to the selected input parameter in response to the input of the new parameter value, to execute a communication sequence that causes the same screen transition as that caused by the detected communication sequences.

20 Claims, 17 Drawing Sheets

(51) Int. Cl.
  *H04L 29/08* (2006.01)
  *G06F 3/0481* (2013.01)
  *G06F 3/0484* (2013.01)

(56) References Cited

U.S. PATENT DOCUMENTS

| | | | |
|---|---|---|---|
| 5,812,780 A * | 9/1998 | Chen | G06F 11/261 |
| | | | 702/122 |
| 5,818,435 A * | 10/1998 | Kozuka | G06F 17/30017 |
| | | | 707/E17.009 |
| 5,877,759 A | 3/1999 | Bauer | |
| 6,292,905 B1 | 9/2001 | Wallach et al. | |
| 6,480,883 B1 | 11/2002 | Tsutsumitake | |
| 6,820,111 B1 | 11/2004 | Rubin et al. | |
| 6,934,749 B1 | 8/2005 | Black et al. | |
| 7,024,256 B2 | 4/2006 | Krzyanowski et al. | |
| 7,730,482 B2 | 6/2010 | Illowsky et al. | |
| 7,788,663 B2 | 8/2010 | Illowsky et al. | |
| 2002/0026507 A1 * | 2/2002 | Sears | H04L 41/22 |
| | | | 709/224 |
| 2002/0116485 A1 | 8/2002 | Black et al. | |
| 2002/0165961 A1 | 11/2002 | Everdell et al. | |
| 2003/0041147 A1 | 2/2003 | van den Oord et al. | |
| 2003/0046401 A1 | 3/2003 | Abbott et al. | |
| 2003/0120762 A1 * | 6/2003 | Yepishin | G06F 17/30899 |
| | | | 709/223 |
| 2003/0126195 A1 | 7/2003 | Reynolds et al. | |
| 2004/0059809 A1 * | 3/2004 | Benedikt | G06F 17/30864 |
| | | | 709/224 |
| 2004/0233235 A1 | 11/2004 | Rubin et al. | |
| 2005/0120108 A1 | 6/2005 | Wisniewski et al. | |
| 2007/0180380 A1 | 8/2007 | Khavari et al. | |
| 2008/0065617 A1 | 3/2008 | Burke et al. | |
| 2009/0006543 A1 | 1/2009 | Smit | |
| 2009/0089846 A1 | 4/2009 | Wang et al. | |
| 2009/0198987 A1 | 8/2009 | Sumioka et al. | |

FOREIGN PATENT DOCUMENTS

| | | |
|---|---|---|
| JP | H06259296 A | 9/1997 |
| JP | H10-340277 A | 12/1998 |
| JP | H11161603 A | 6/1999 |
| JP | 2001092524 A | 4/2001 |
| JP | 2001-290809 A | 10/2001 |
| JP | 2002007020 A | 1/2002 |
| JP | 2003122992 A | 4/2003 |
| JP | 2005130087 A | 5/2005 |
| JP | 2005148857 A | 6/2005 |
| JP | 2006-072772 A | 3/2006 |
| JP | 2007004734 A | 1/2007 |
| WO | 2005065148 A2 | 7/2005 |

OTHER PUBLICATIONS

Final Office Action for U.S. Appl. No. 12/234,769, dated Oct. 28, 2010, 22 pages, U.S. Patent and Trademark Office.
Office Action for U.S. Appl. No. 12/234,769, dated Jun. 27, 2011, 30 pages, U.S. Patent and Trademark Office.
Final Office Action for U.S. Appl. No. 12/234,769, dated Dec. 21, 2011, 28 pages, U.S. Patent and Trademark Office.
Office Action for U.S. Appl. No. 12/234,769, dated Oct. 16, 2012, 24 pages, U.S. Patent and Trademark Office.
Final Office Action for U.S. Appl. No. 12/234,769, dated Sep. 25, 2013, 25 pages, U.S. Patent and Trademark Office.
Examiner's Answer to Appeal Brief for U.S. Appl. No. 12/234,769, dated May 13, 2014, 32 pages, U.S. Patent and Trademark Office.
Supplemental Examiner's Answer to Appeal Brief for U.S. Appl. No. 12/234,769, dated Nov. 13, 2014, 33 pages, U.S. Patent and Trademark Office.
Notice of Allowance for U.S. Appl. No. 12/234,769, dated Mar. 9, 2016, 7 pages, U.S. Patent and Trademark Office.

* cited by examiner

50A

```
1: POST /admin/secure/logon.do HTTP/1.1
2: Accept: image/gif, limage/x-xbitmap, image/pjpeg, */*
3: Accept-Language: ja
4: Accept-Encoding: gzip, deflate
5: User-Agent: △△△/4.0
6: Host: terminal□□□
7: Connection: Keep-Alive
```

```
1: HTTP/1.1 200 OK
2: Date: Thu 13 Sep 2007 14:49:01 GMT
3: Server: △△△
4: Content-Type: text/html; charset=UTF-8
5: Content-Language: ja
6:
7: <HTML><HEAD>
```

```
1: POST /admin/virtualHostCollection.do HTTP/1.1
2: Accept: image/gif, limage/x-xbitmap, image/pjpeg, */*
3: Accept-Language: ja
4: Accept-Encoding: gzip, deflate
5: User-Agent: △△△/4.0
6: Host: terminal□□□
7: Connection: Keep-Alive
        ⋮
X: button.new=xxxx&definitionName=VirtualHost.collection.buttons.panel ...
        ⋮
```

```
1: HTTP/1.1 200 OK
2: Date: Thu 13 Sep 2007 14:50:01 GMT
3: Server: △△△
4: Content-Type: text/html; charset=UTF-8
5: Content-Language: ja
        ⋮
Y   :<tr valign= "top">
Y+1:<td class= "table-text" scope="row " valign"top " nowrap>
Y+2:<label for= "name">名前</label>
Y+3:</td>
Y+4:<tr valign= "top">
Y+5:<td class= "table-text" scope="row " valign"top " nowrap>
Y+6:<img src= "images/attend.gif" width= "6" height= "15" align= "absmiddle">
Y+7:<input type= "text" name= "name" size= "30" value= "" id= "name">
Y+8:</td>
        ⋮
```

```
1: POST /admin/virtualHostDetail.do HTTP/1.1
2: Accept: image/gif, limage/x-xbitmap, image/pjpeg, */*
3: Accept-Language: ja
4: Accept-Encoding: gzip, deflate
5: User-Agent: △△△/4.0
6: Host: terminal□□□
7: Connection: Keep-Alive
          ⋮
Z: action=New&name=vh005&save=OK
          ⋮
```

```
1: HTTP/1.1 200 OK
2: Date: Thu 13 Sep 2007 14:51:01 GMT
3: Server: △△△
4: Content-Type: text/html; charset=UTF-8
5: Content-Language: ja
          ⋮
W  :<select name="column2">
W+1:<option value="default" selected="selected">default</option>
W+2:<option value="admin_host">admin_host</option>
W+3:<option value="Test1 Host">Test1 Host</option>
W+4:<option value="vh001">vh001</option>
W+5:<option value="vh002">vh002</option>
W+6:<option value="vh003">vh003</option>
W+7:<option value="vh004">vh004</option>
W+8:<option value="vh005">vh005</option>
W+9:</select>
          ⋮
```

1: POST /admin/virtualHostDetail.do HTTP/1.1
2: Accept: image/gif, Iimage/x-xbitmap, image/pjpeg, */*
3: Accept-Language: ja
4: Accept-Encoding: gzip, deflate
5: User-Agent: △△△/4.0
6: Host: terminal□□□
7: Connection: Keep-Alive

⋮

L: ……&column2=vh005

| ID | PAGE | NUMBER OF COMMUNICATIONS | FREQUENCY | GENERATE PROGRAM? |
|----|------|--------------------------|-----------|-------------------|
| 1 | ☐☐☐ | 4 | 7 | GENERATE |
| 2 | ☐☐☐☐☐ | 7 | 9 | GENERATE |
| 3 | ☐☐☐☐ | 5 | 8 | GENERATE |
| 4 | ☐☐☐☐ | 6 | 6 | GENERATE |
| 5 | ☐☐☐ | 4 | 7 | GENERATE |
| 6 | ☐☐☐☐ | 5 | 6 | GENERATE |
| 7 | ☐☐☐☐ | 6 | 6 | GENERATE |
| 8 | ☐☐☐ | 4 | 9 | GENERATE |

PROGRAM NAME
EXPLANATION OF PROGRAM

SETTING OF INPUT PARAMETERS

| NO. | LABEL NAME | ID | PARAMETER VALUES INCLUDED IN HISTORY | EXPLANATION | OPTION |
|---|---|---|---|---|---|
| 1 | | name | vh001, vh002, vh003 | | ⊙ VARIABLE PARAMETER<br>○ FIXED PARAMETER<br>○ INPUT BY INTERRUPTING AUTOMATIC EXECUTION |

| NO. | LABEL NAME | IDs INCLUDED IN HISTORY | PARAMETER VALUE | EXPLANATION | GROUP TOGETHER TO ONE INPUT PARAMETER? |
|---|---|---|---|---|---|
| 2 | | name, id, param | term002 | | ⊙ YES<br>○ NO |

| NO. | LABEL NAME | RESPONSE-SIDE ID | REQUEST-SIDE ID | PARAMETER VALUE | EXPLANATION | SET TO AUTOMATIC INPUT PARAMETER? |
|---|---|---|---|---|---|---|
| 3 | | secure id | auth id | 323564 | | ⊙ YES<br>○ NO |

[ENTER]

FIG. 17

AUTOMATING USER'S OPERATIONS

CROSS-REFERENCE TO RELATED APPLICATIONS

The present application is a continuation of U.S. patent application Ser. No. 12/234,769 filed on Sep. 22, 2008.

FIELD OF THE INVENTION

The present invention relates to a technique of automating user's operations. More particularly, the present invention relates to a technique of automating user's operations based on a communication history.

BACKGROUND

Recently, web pages are provided with various objects, such as check boxes, radio buttons and input forms, for accepting users' inputs. A user performs operations on the objects on the sequentially displayed web pages so as to accomplish a specific purpose, which may be, e.g., purchase of a product, display of information, or change of a preset value. A series of operations the user performs may be similar to those the user performed in the past. Even in such a case, the user is required to perform the series of operations from the beginning to accomplish the intended purpose.

The following three patent documents each disclose a technique of automating user's operations: Japanese Unexamined Patent Publication (Kokai) No. 10-340277; Japanese Unexamined Patent Publication (Kokai) No. 2002-007020; and Japanese Unexamined Patent Publication (Kokai) No. 2001-290809.

SUMMARY

A conceivable method of automating the user's operations is to reproduce the operations received via the mouse and keyboard. This method, however, requires that the computer for storing the operations and the computer for reproducing the operations are substantially identical to each other, which renders the method unpractical. For example, if the computer for storing the operations and the computer for reproducing them differ from each other in terms of resolution of the screen or arrangement of the windows, the operations may not be reproduced properly. Further, it may not be useful to simply reproduce the operations exactly the same as those performed in the past. For example, in purchase of products, although the purchasing processes may be similar, the products to be purchased will differ in many cases. Furthermore, in change of preset values, even if the changing procedure may be similar, the preset values themselves often differ from each other. Therefore, determination as to which portion of the operations to automate and which portion not to automate will be left to the user, which is troublesome for the user.

In view of the foregoing, an object of the present invention is to provide a system, method and program that can solve the above-described problems. The object is achieved by a combination of the features recited in the independent claims of the present application. The dependent claims define further advantageous embodiments of the present invention.

SUMMARY

To solve the above-described problems, in a first aspect of the present invention, there is provided a system performing a user's operation on behalf of a user, which includes: a storage device; a history acquisition unit which acquires a history of communication of a client computer with a server computer in receipt of a user's operation and stores the history in the storage device; a detection unit which accesses the storage device to detect from the history a plurality of communication sequences that cause the same screen transition on the client computer; a first selection unit which accesses the storage device to select an input parameter that is included in all of the plurality of communication sequences and that has a parameter value changed for each communication sequence; an input accepting unit which causes the client computer to accept an input of a new parameter value to be set as a parameter value of the selected input parameter; and an execution unit which sets the new parameter value to the selected input parameter in response to the input of the new parameter value, and causes the client computer to execute a communication sequence that causes the same screen transition as the screen transition caused by the detected communication sequences. Also provided are a program for causing a computer to function as the system, and a method for performing a user's operation on behalf of a user by the system. It is noted that the above summary does not list all the necessary features of the present invention, and that a sub-combination of these features may also implement the invention.

BRIEF DESCRIPTION OF THE DRAWINGS

FIG. 3 shows an example of a request 50A according to the embodiment;

FIG. 4 shows an example of a response 52A according to the embodiment;

FIG. 6 shows an example of a request 50B according to the embodiment;

FIG. 7 shows an example of a response 52B according to the embodiment;

FIG. 9 shows an example of a request 50C according to the embodiment;

FIG. 10 shows an example of a response 52C according to the embodiment;

FIG. 12 shows an example of a request 50D according to the embodiment;

FIG. 16 shows an example of a screen 106X displayed on the web browser 106 in S1450;

FIG. 17 shows an example of the screen 106X displayed on the web browser 106 in S1460;

DETAILED DESCRIPTION

While the present invention will now be described with reference to an embodiment, it should be noted that the following embodiment is not intended to restrict the claimed invention. It should also be noted that all the combinations of the features explained in the following embodiment are not necessarily indispensable for the solving means of the present invention.

Figure 1:
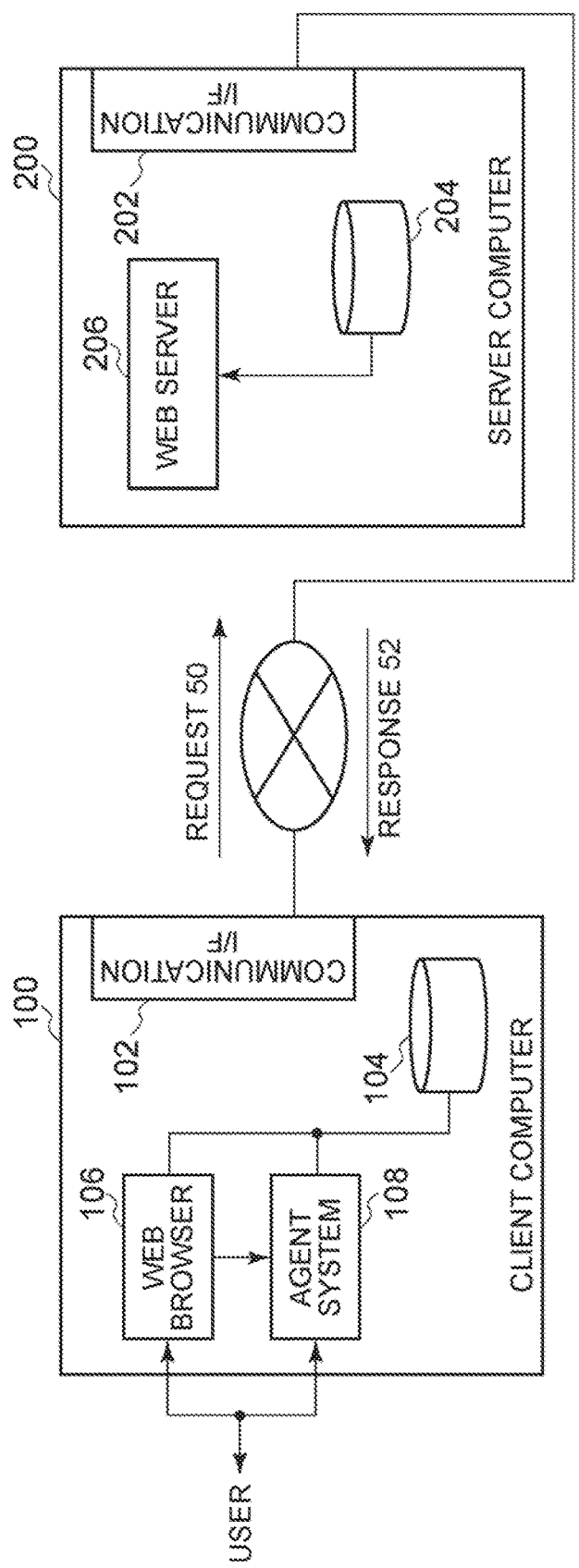
FIG. 1 schematically shows the overall configuration of an information system 10 according to an embodiment of the present invention.

FIG. 1 schematically shows an overall configuration of an information system 10 according to an embodiment of the present invention. The information system 10 includes a client computer 100 and a server computer 200. The client computer 100 has, as its fundamental hardware, a communication interface 102 such as a network interface card, and a storage device 104 such as a hard disk drive. When a program stored in the storage device 104 is executed by a central processing unit, the client computer 100 serves as a web browser 106 and an agent system 108.

The server computer 200 has, as its fundamental hardware, a communication interface 202 such as a network interface card, and a storage device 204 such as a hard disk drive. When a program stored in the storage device 204 is executed by a central processing unit, the server computer 200 serves as a web server 206.

The web browser 106, in response to a user's operation, transmits a request 50 in compliance with a communication protocol such as HTTP (Hypertext Transfer Protocol) to the web server 206. In response, the web server 206 returns a response 52 in compliance with HTTP or the like to the web browser 106. This causes transition of the screen displayed on the web browser 106 to another screen.

The user performs operations on the screens thus changed sequentially, to thereby accomplish an intended purpose, which may be change of a preset value saved in the server computer 200, purchase of a product on a web site implemented by the server computer 200, or the like.

The agent system 108 records a history of communication of the client computer 100 with the server computer 200 which has been performed in response to the user's operations. Then, the agent system 108 detects from the history any communication sequences repeated with a high frequency, for example. Further, the agent system 108 selects, from these communication sequences, any input parameter having a parameter value changed for each communication sequence.

The agent system 108 accepts an input of a new parameter value to be set for the selected input parameter, and reproduces the communication sequence according to the input of the parameter value. This causes the client computer 100 to operate as if it received a series of operations from the user again. In this manner, the processing carried out in the past can be reproduced with only an initial input of a parameter value by the user.

As described above, the agent system 108 according to the present embodiment aims at, not only reproducing a communication sequence, but also automatically detecting a sequence suitable for reproduction and automatically selecting a necessary variable parameter, so as to improve usability for the user. Hereinafter, the present invention will be explained in more detail.

Figure 2:
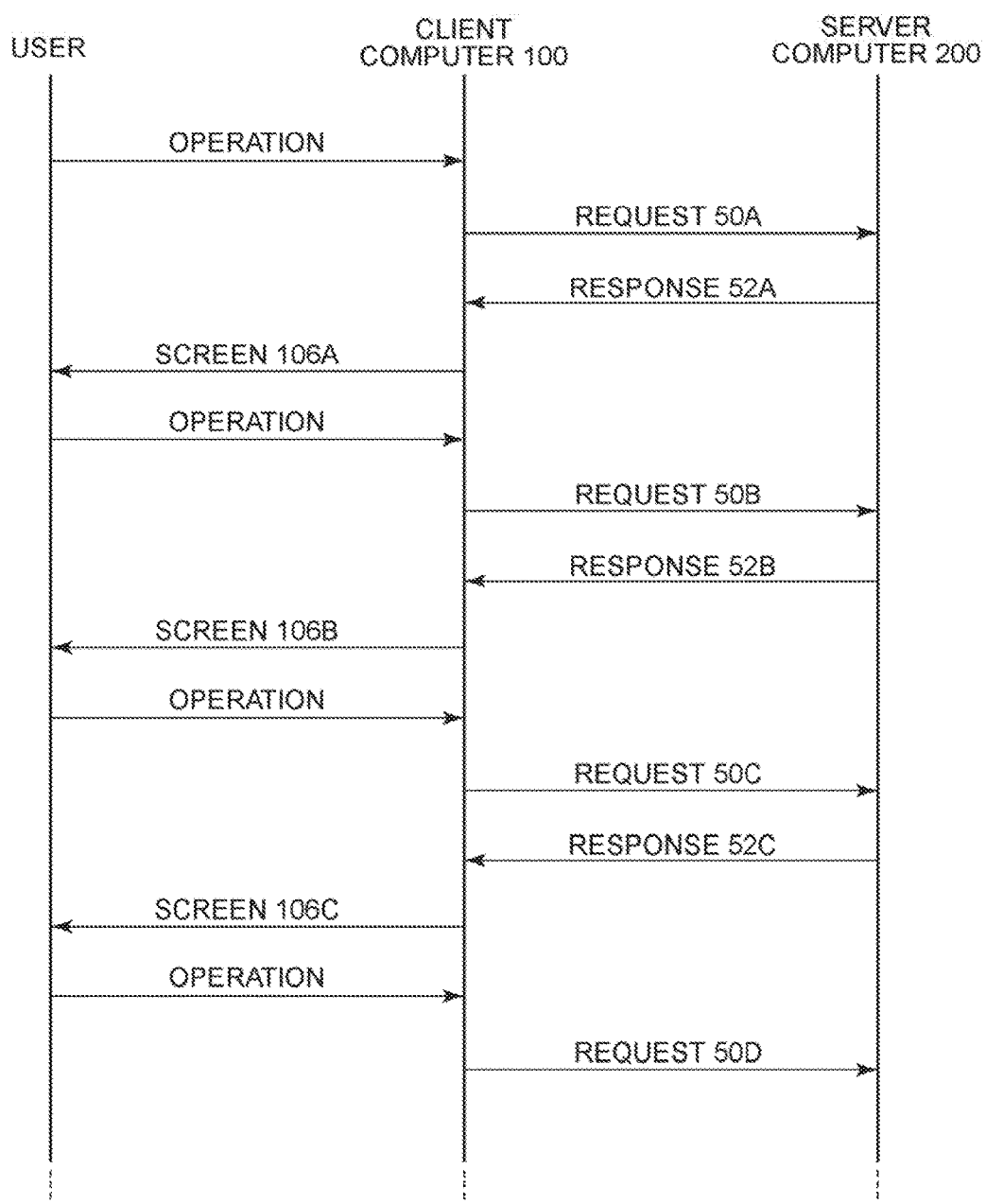
FIG. 2 shows a specific example where a client computer 100 according to the embodiment communicates with a server computer 200.

FIG. 2 shows a specific example where the client computer 100 of the present embodiment communicates with the server computer 200. A user may carry out prescribed operations on a plurality of web pages sequentially changed, so as to accomplish a certain purpose. In FIG. 2, screens 106A, 106B and 106C represent such a set of web pages.

Further, a request 50A indicates the request transmitted by the client computer 100 to cause the screen 106A to be displayed by the web browser 106, and a response 52A is the response to the request 50A. A request 50B indicates the request transmitted by the client computer 100 in response to the user operating the screen 106A, and a response 52B is the response to the request 50B. In receipt of the response 52B, the web browser 106 displays the screen 106B.

Further, a request 50C indicates the request transmitted by the client computer 100 in response to the user operating the screen 106B, and a response 52C is the response to the request 50C. The web browser 106 displays the screen 106C in receipt of the response 52C. A request 50D indicates the request transmitted by the client computer 100 in response to the user operating the screen 106C.

FIG. 3 shows an example of the request 50A according to the present embodiment. The first line is a request line, which includes a command name "POST", a path name "/admin/secure/logon.do", and a protocol name "HTTP/1.1". The second through fourth lines indicate attributes of the files accepted by the web browser 106. The fifth line indicates the type of the web browser 106.

The sixth line indicates a host name of the server computer 200 which is the destination of the request. In this example, "terminal□□□" is the host name of the server computer 200. In conjunction with the first line, this request 50A is a request for the web page designated by the URL "terminal□□□/admin/secure/logon.do". The seventh line shows that continuation of connection is requested.

FIG. 4 shows an example of the response 52A according to the present embodiment. The response 52A shown in FIG. 4 is returned in response to the request 50A shown in FIG. 3. The first line includes the protocol name "HTTP/1.1" and an identifier "200 OK" indicating that communication was successful. The second line shows date and time of communication. The third line shows the type of the web server 206. The fourth line shows the type of the content included in the response 52A. Specifically, "text/html" indicates that it is the HTML data.

Further, "UTF-8" shows a character set. The fifth line indicates language setting for the content included in the response 52A. The seventh and following lines show the web page to be displayed on the web browser 106. In the example shown in FIG. 4, the web page starts with an HTML tag and a HEAD tag. In receipt of this response 52A, the web browser 106 displays the screen 106A shown in FIG. 5.

Figure 5:
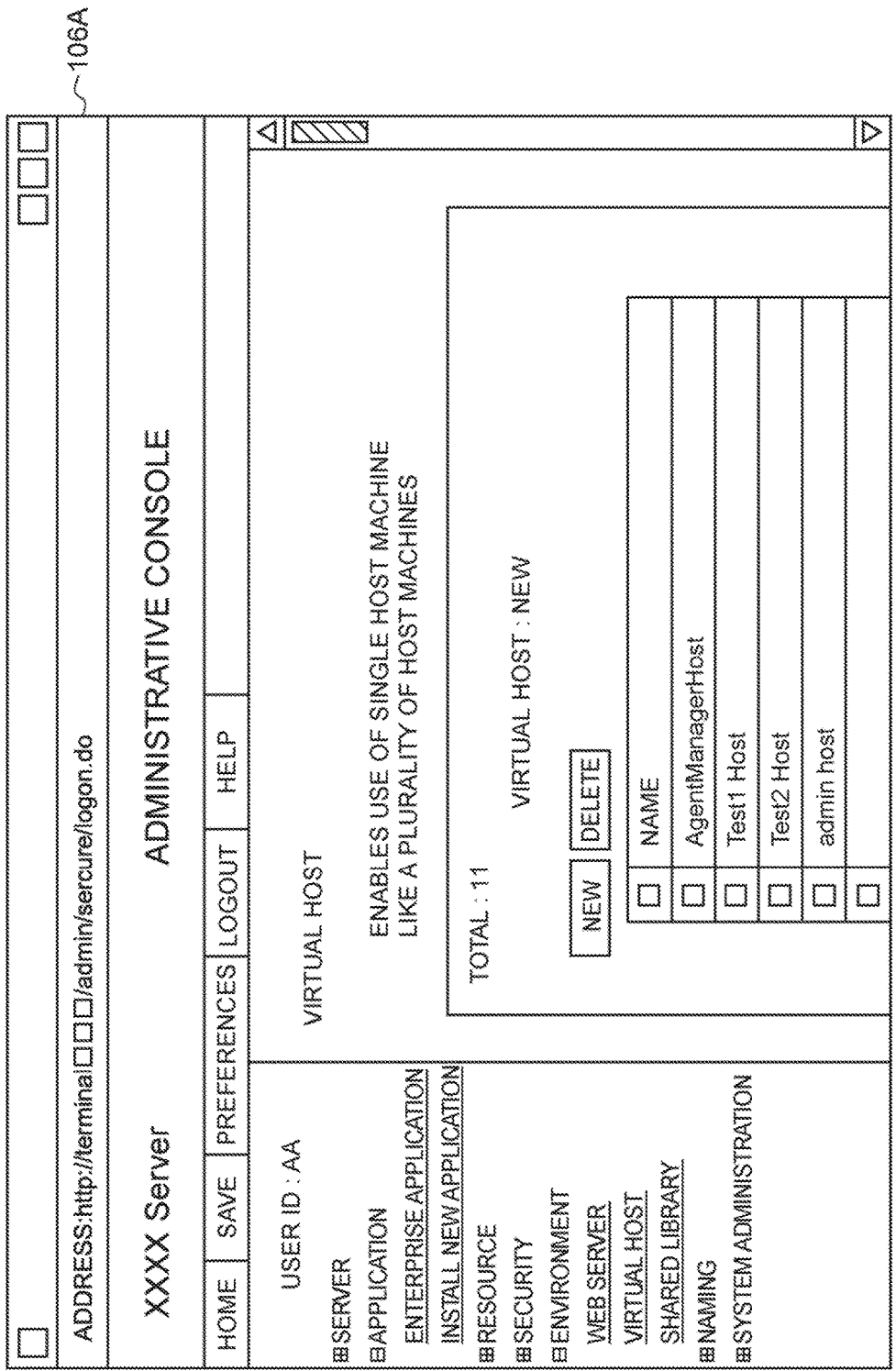
FIG. 5 shows an example of a screen 106A displayed by a web browser 106 of the embodiment in response to the response 52A.

FIG. 5 shows an example of the screen 106A which is displayed by the web browser 106 of the present embodiment in receipt of the response 52A. For example, the screen 106A corresponds to a screen for administration of a prescribed server (the server computer 200 may also serve as this server) or for change of setting of the server.

Specifically, on the address field, the URL "terminal□□□/admin/secure/logon.do" designated by the request 50A is displayed. Further, on the left side of the screen, various menus for changing the settings are displayed. When the user clicks on "virtual host" in the menus, the window as in the lower right of the screen is displayed.

The "virtual host" indicates a function to cause a single physical computer to be recognized by another computer as if a plurality of computers were operating. In this window, an operation for creating a new virtual host is received from the user. For example, when the user operates the button "new" near the lower center of the screen 106A, the server computer 200 starts processing of creating a new virtual host. A request that the web browser 106 transmits as this button is operated is shown in FIG. 6.

FIG. 6 shows an example of the request 50B according to the present embodiment. The first line is similar to the request line shown in FIG. 3, except that the path name is different. Specifically, the first line indicates that the web page designated by the path name "/admin/virtualHostCollection.do" is requested. The second through seventh lines are approximately the same as those of the request 50A shown in FIG. 3, and thus, description thereof will not be repeated.

Following the first through seventh lines (called the "header part") is a body part of the request 50B. For example, the X-th line shows an input parameter based on a user's operation. The portion "button.new=xxxx" in the line indicates that the "new" button was operated by the user. As such, the user's operation is expressed as a set of the input parameter "button.new" and its parameter value "xxxx", and is transmitted to the web server 206 as a part of the request 50B.

FIG. 7 shows an example of the response 52B according to the present embodiment. The header part on the first through fifth lines is approximately the same as that of the response 52A shown in FIG. 4, and thus, description thereof will not be repeated. The body part following the header part shows the web page to be displayed on the web browser 106. For example, the Y-th through (Y+8)-th lines include various tags for displaying texts and input field in an aligned manner using the HTML table function.

Specifically, the <tr> tag designates an element in the row direction in the table, and the <td> tag designates a cell included in a certain row in the table. As a result, the text "name" included in the (Y+2)-th line is displayed in a prescribed position on the web page. Further, the image data designated by the (Y+6)-th line and the input field designated by the (Y+7)-th line are displayed side by side.

Figure 8:
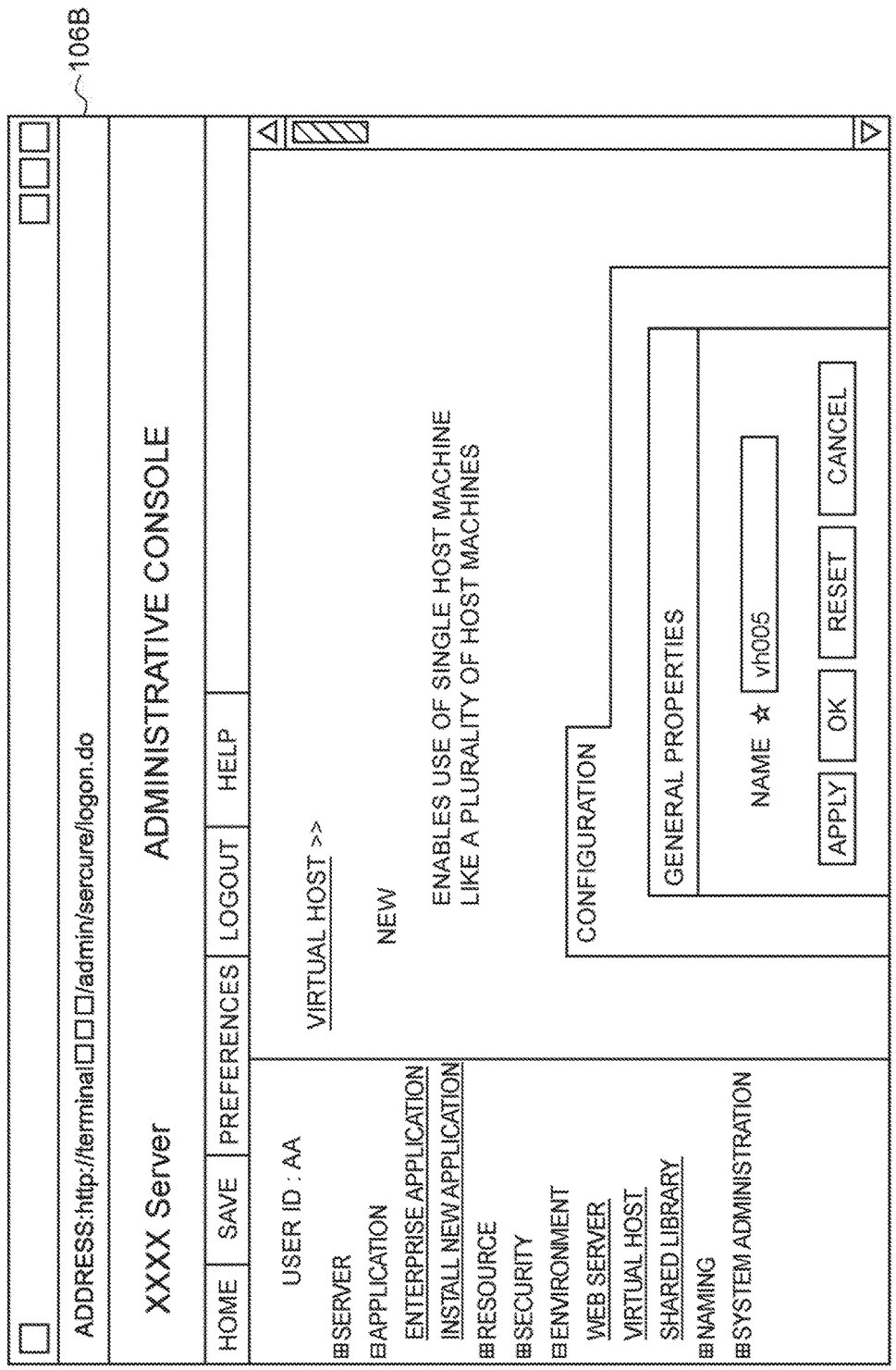
FIG. 8 shows an example of a screen 106B displayed by the web browser 106 of the embodiment in response to the response 52B.

FIG. 8 shows an example of the screen 106B which is displayed by the web browser 106 of the present embodiment in receipt of the response 52B. When the user operates the "new" button on the screen 106A, the screen on the web browser 106 is changed to this screen 106B. A window for accepting an input of the name of the virtual host is displayed on the lower right of the screen 106B.

In this window, as explained above with reference to FIG. 7, the text data "name", the image data having, for example, a star shape, and the input field are displayed in alignment. The user can determine the name of the virtual host by inputting a character string in the input field and operating the "OK" button. Here, it is assumed that the "OK" button is operated following the input of the character string "vh005".

FIG. 9 shows an example of the request 50C according to the present embodiment. The first line is similar to the request line shown in FIG. 3, except that the path name is different. That is, the first line indicates that the web page designated by the path name "/admin/virtualHostDetail.do" is requested. The second through seventh lines are approximately the same as those of the request 50A shown in FIG. 3, and thus, description thereof will not be repeated.

Following the header part on the first through seventh lines is the body part of the request 50C. For example, the Z-th line indicates an input parameter based on a user's operation. The portion "action=New" in the line indicates that creation of a new virtual host has been designated, and the portion "name=vh005" indicates that the name of the virtual host is "vh005", and the portion "save=OK" indicates that the setting of the virtual host should be saved.

FIG. 10 shows an example of the response 52C according to the present embodiment. The header part on the first through fifth lines is approximately the same as that of the response 52A shown in FIG. 4, and thus, description thereof will not be repeated. The body part following the header part indicates the web page to be displayed on the web browser 106. For example, the W-th through (W+9)-th lines indicate a pull-down menu for setting a parameter value for the input parameter "column2".

Specifically, the W-th line indicates that the input parameter to be set is "column2". The (W+1)-th through (W+8)-th lines respectively show terms to be displayed on the pull-down menu, which are: "default", "admin_host", "Test1 Host", "vh001", "vh002", "vh003", "vh004", and "vh005".

Figure 11:
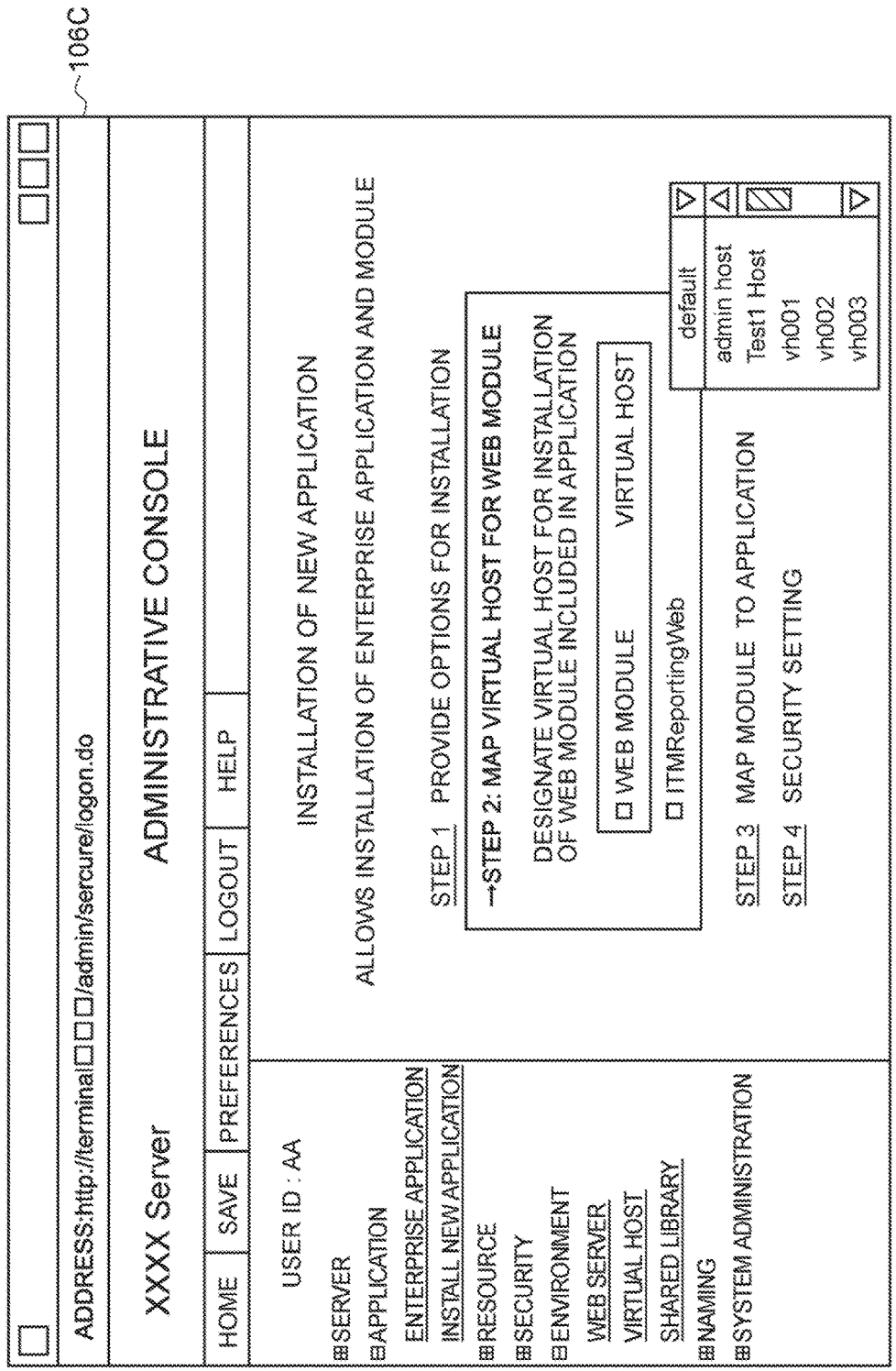
FIG. 11 shows an example of a screen 106C displayed by the web browser 106 of the embodiment in response to the response 52C.

FIG. 11 shows an example of the screen 106C which is displayed by the web browser 106 of the present embodiment in receipt of the response 52C. In response to the user's operation of the "OK" button on the screen 106B, the screen of the web browser 106 changes from the screen 106B to the screen 106C. A window for performing detailed setting of the virtual host is displayed on the lower right of the screen 106C.

In this window, as explained above with reference to FIG. 10, the pull-down menu for setting a parameter value for the input parameter is displayed. The user can use this pull-down menu to select a parameter value to thereby determine, for example, the host for installing a Web module. Here, it is assumed that "vh005" is selected.

FIG. 12 shows an example of the request 50D according to the present embodiment. The first through seventh lines are approximately the same as those in the request 50C shown in FIG. 9, and thus, description thereof will not be repeated. The L-th line in the body part indicates that the parameter value "vh005" is set for the input parameter "column2". In response, installation processing for the virtual host vh005 is started in the server computer 200.

As described above with reference to FIGS. 2-12, the user performs various operations on the sequentially displayed screens of the web browser 106 to achieve the purpose of, e.g., creating a new virtual host. The operations not only include clicking on a button or an object such as a tag, but also include inputting of characters to the input field. In response to these operations, as the internal processing, the web browser 106 sequentially transmits requests to the web server 206, and the web server 206 sequentially returns responses to the web browser 106. The agent system 108 according to the present embodiment takes out a communication sequence to be automated from among the series of communication sequences in the past as described above and provides it to the user to carry out the operations on behalf of the user. This will now be explained with reference to FIG. 13.

Figure 13:
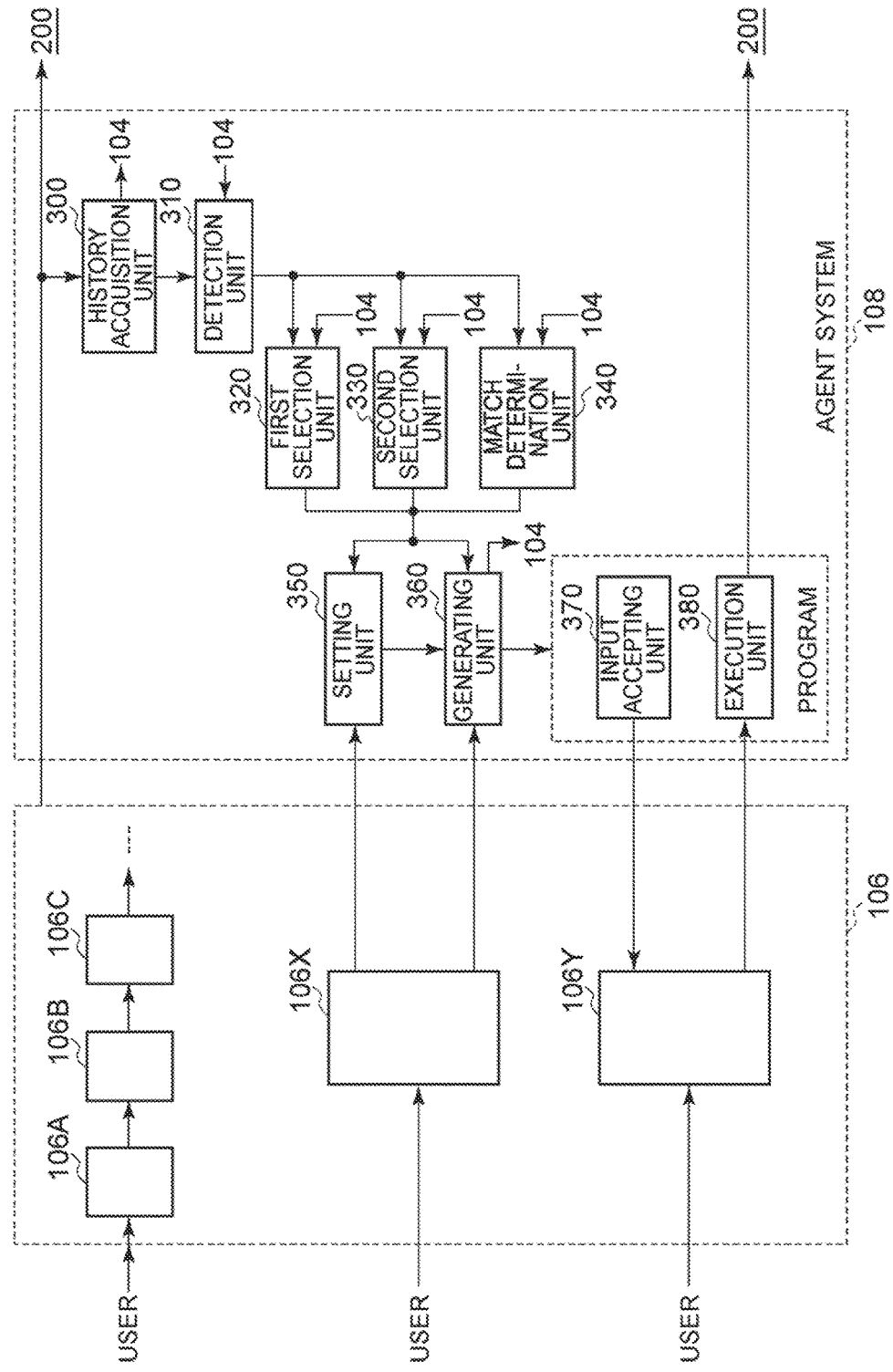
FIG. 13 shows an example of the functional configuration of an agent system 108 according to the embodiment.

FIG. 13 shows an example of the functional configuration of the agent system 108 according to the present embodiment. The agent system 108 has a history acquisition unit 300, a detection unit 310, a first selection unit 320, a second selection unit 330, a match determination unit 340, a setting unit 350, and a generating unit 360. The history acquisition unit 300 acquires a history of the client computer 100 communicating with the server computer 200 in receipt of user's operations, and stores the history in the storage device 104.

The history includes a request, a response, or a combination thereof, as those shown in FIGS. 1-12. This means that the history includes a variety of pieces of information including not only the HTTP command and the requested URL but also the input parameter and its parameter value.

In the present embodiment, the history acquisition unit 300 is provided in the client computer 100, and acquires the request the web browser 106 is about to transmit to the web server 206 as well as the response the web browser 106 is about to receive from the web server 206 as the history. Alternatively, the history acquisition unit 300 may be provided in the server computer 200, in which case it may acquire the request the web server 206 is about to receive from the web browser 106 and the response the web server 206 is about to transmit to the web browser 106 as the history. Still alternatively, the history acquisition unit 300 may be provided in a proxy server relaying communication between the client computer 100 and the server computer 200, in which case it may acquire, as the history, the request and response transferred over the communication line.

The detection unit 310 accesses the storage device 104 to detect from the history a plurality of communication sequences that cause the same screen transition on the client computer 100. As used herein, the "screen transition" refers to transition of screens determined for example by the URLs sequentially transmitted as parts of the requests. Specifically, in the example shown in FIGS. 1-12, the screen transition includes transition of the screen designated by the URL "/admin/secure/logon.do" to the screen designated by the URL "/admin/virtualHostCollection.do", and then to the screen designated by the URL "/admin/virtualHostDetail.do".

For detection of the communication sequence, the request line of each request transmitted from the client computer 100 to the server computer 200, i.e., the first line in the examples shown in FIGS. 1-12, is referred to. More specifically, for example, the detection unit 310 firstly sorts the requests included in the history in time series, and eliminates any unnecessary request indicating occurrence of an error or the like. The detection unit 310 then extracts the command name and the URL from each request. Provided that the command name indicates a request for a page (for example, on the condition of POST or GET in HTTP), the detection unit 310 selects the URL corresponding to the command name. The sequence of the URLs thus selected indicates the screen transition.

The detection unit 310 specifies all the screen transitions included in the history in this manner, and then detects from the history a plurality of communication sequences that cause the same screen transition. For example, the detection unit 310 may detect as each of the communication sequences the one that appears with a frequency equal to or greater than a predetermined reference frequency. This may be done for example by detecting any communication sequence that appears a predetermined number of times or more within a predetermined period in the past. As a result, the screen transition of frequent occurrence is specified.

Next, the first selection unit 320 accesses the storage device 104, and selects an input parameter that is included in all of the detected communication sequences and that has a parameter value changed for each communication sequence. For example, in the example shown in FIGS. 5 and 6 above, the parameter value "xxxx" set for the input parameter "button.new" when the button "new" is operated is not changed for each communication sequence.

In contrast, in the example shown in FIGS. 8 and 9 above, the parameter value "vh005" set for the input parameter "name" may be changed according to the user's operation. The first selection unit 320 selects such an input parameter based on the history that the user actually changed the parameter value. By way of example, if the input parameter "name" has been changed to "vh001", "vh002" or "vh003" for each communication sequence, the first selection unit 320 selects this input parameter "name".

The second selection unit 330 accesses the storage device 104 and selects, for at least one of the plurality of communication sequences detected by the detection unit 310, a plurality of input parameters having the same parameter value set therefor. For example, in the above-described example in FIG. 9, the parameter value "vh005" is set for the input parameter "name". In the above-described example in FIG. 12, the parameter value "vh005" is set for the input parameter "column2" as well. Accordingly, the second selection unit 330 selects these input parameters "name" and "column2".

The match determination unit 340 accesses the storage device 104 and determines, for at least one of the communication sequences detected by the detection unit 310, whether the parameter value of a first parameter included in a first response matches the parameter value of a second parameter included in a second request transmitted later than the first response.

For example, assume that the parameter value "vh005" for the first parameter "value" on the (W+8)-th line in FIG. 10 above is set as the parameter value for the second parameter "column2" on the L-th line in FIG. 12 above. In this case, the match determination unit 340 determines that the parameter values of these parameters match.

Next, the setting unit 350 displays the selected results of the first selection unit 320 and the second selection unit 330 as well as the determined result of the match determination unit 340 to the user for confirmation as to whether the communication sequence may be automated based on the results. The screen for such confirmation will be illustrated as a screen 106X later.

The generating unit 360 generates a program for causing the client computer 100 to reproduce the communication sequence based on the result of confirmation by the setting unit 350, and stores the program in the storage device 104. This program is a so-called wizard program, which accepts an input of the parameter value from the user in an interactive manner for reproduction of the communication sequence. The program may be carried out by the agent system 108 itself. In such a case, the agent system 108 serves as an input accepting unit 370 and an execution unit 380.

The input accepting unit 370 causes the web browser 106 of the client computer 100, for example, to accept an input of a new parameter value to be set as the parameter value of the input parameter selected by the first selection unit 320. Further, the input accepting unit 370 causes the web browser 106 of the client computer 100, for example, to accept an input of a new parameter value to be set commonly for the plurality of input parameters selected by the second selection unit 330. It should be noted that whether to accept the inputs of the new parameter values for the input parameters depends on the result of confirmation with the user by the generating unit 360.

The execution unit 380, in response to the inputs of the new parameter values, sets the new parameter values to the respective input parameters selected by the first selection unit 320 and the second selection unit 330, to thereby reproduce the communication sequence. This communication sequence causes the same screen transition as the one caused by the communication sequences detected by the detection unit 310. For example, the execution unit 380 may read the communication sequence from the storage device 104 and transmit it to the web server 206 after changing only the parameter values of the input parameters.

Further, the execution unit 380 may automatically set the parameter value based on the result of determination by the match determination unit 340. Specifically, the execution unit 380 may set the parameter value of the first parameter, received as a part of the first response during the execution of the communication sequence, to the second parameter included in the second request transmitted later than the first response. In this manner, a subsequent request can be determined based on the response, which ensures a wider range of variations for automation.

It is noted that the input accepting unit 370 and the execution unit 380 may work on another client computer other than the client computer 100, to cause the other client computer to reproduce communication. Specifically, the program generated in the storage device 104 may be transferred to the other client computer by a recording medium or via a telecommunication line and executed by the other client computer. As such, the computer that acquires the history and the computer that reproduces the communication sequence based on the history may be different from each other.

Figure 14:
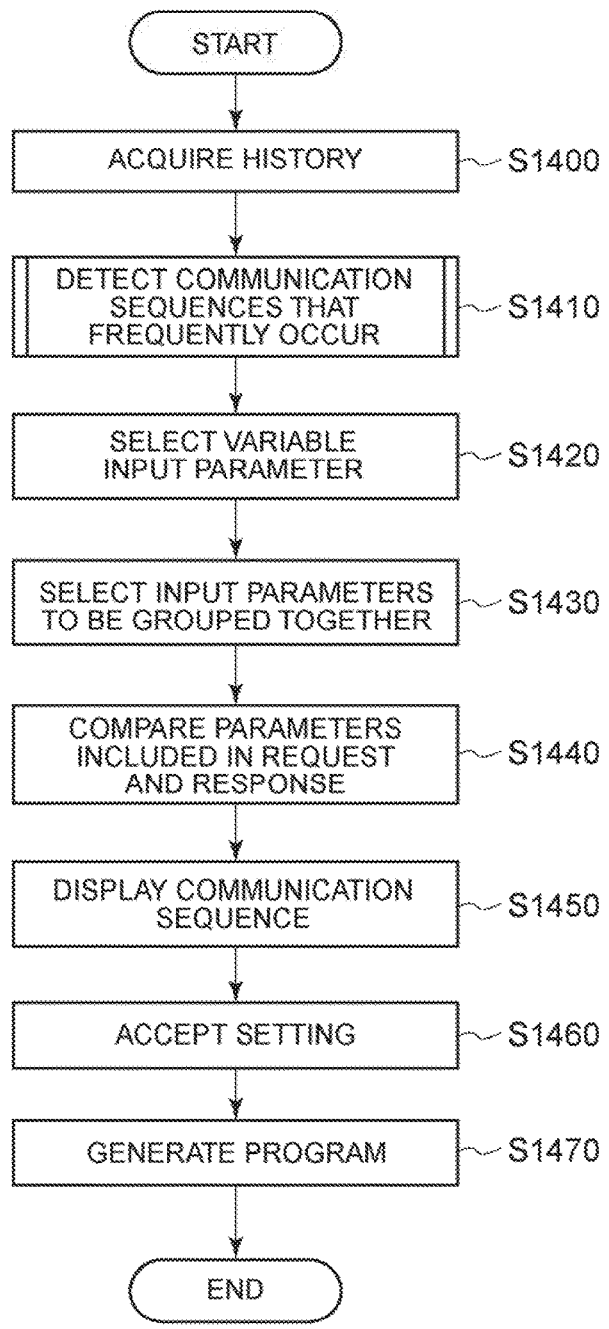
FIG. 14 shows a flow of the processing in which the agent system 108 of the embodiment generates a program based on a communication history.

FIG. 14 shows a flow of the processing in which the agent system 108 according to the present embodiment generates a program based on a communication history. The history acquisition unit 300 acquires and stores in the storage device 104 the history of the client computer 100 communicating with the server computer 200 in receipt of user's operations (S1400).

Next, the detection unit 310 detects a plurality of communication sequences that cause the same screen transition on the client computer 100 and that appear with a frequency equal to or greater than a predetermined reference frequency (S1410). Next, the first selection unit 320 selects an input parameter that is included in all of the detected communication sequences and that has its parameter value changed for each communication sequence (S1420).

Further, the second selection unit 330 selects, for at least one of the plurality of communication sequences detected by the detection unit 310, a plurality of input parameters having the same parameter value set therefor (S1430). These input parameters are grouped together for a batch entry, on the condition of agreement by the user. That is, during reproduction of the communication sequence, the same parameter value is set for each of these input parameters.

Further, the match determination unit 340 checks, for at least one of the plurality of communication sequences detected by the detection unit 310, for a match between the parameter value of a first parameter included in a first response and the parameter value of a second parameter included in a second request transmitted later than the first response (S1440).

Next, the setting unit 350 displays the selected results of the first selection unit 320 and the second selection unit 330 as well as the checked result of the match determination unit 340 (S1450), and confirms to the user whether the communication sequence may be automated based on the results (S1460).

The generating unit 360 generates and stores in the storage device 104 a program for causing the client computer 100 to reproduce the communication sequence based on the result of confirmation by the setting unit 350 (S1470). This program may be output externally to another client computer.

Figure 15:
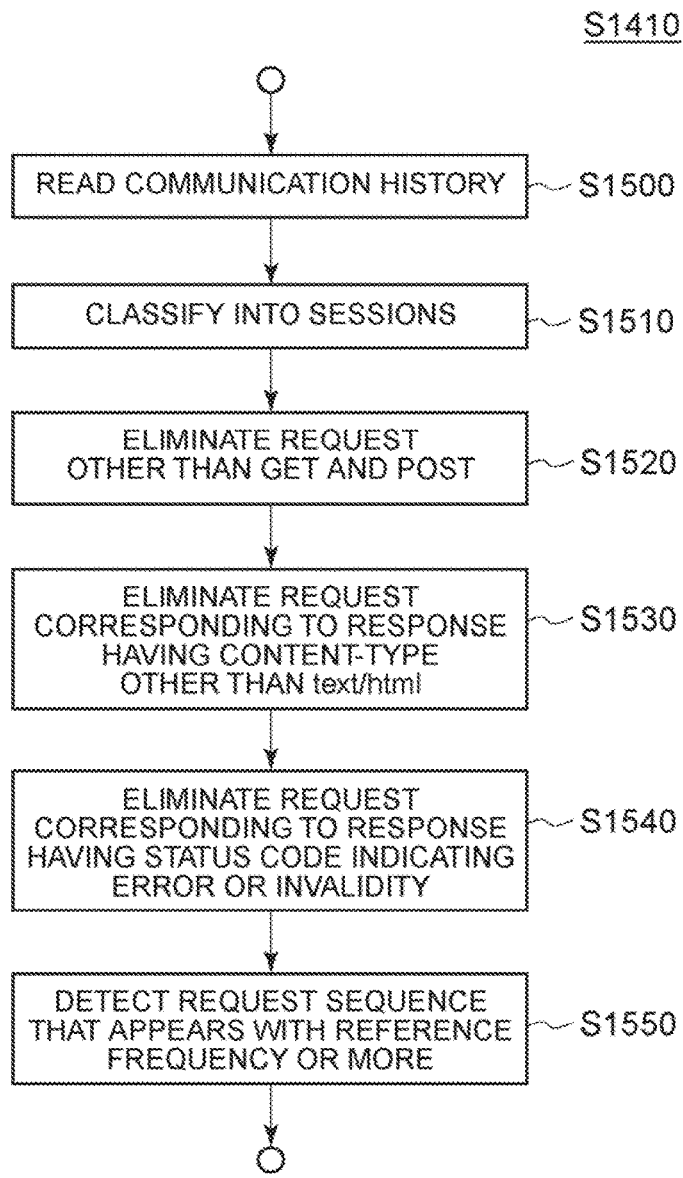
FIG. 15 shows details of the flow of the process in S1410.

FIG. 15 shows details of the flow of the process performed in S1410. Firstly, the detection unit 310 accesses the storage device 104 to read a communication history (S1500). It is assumed that this communication conforms to HTTP. Next, the detection unit 310 classifies the read history into communication sessions (S1510).

The method of implementing such classification depends on the method of implementing the sessions. For example, the detection unit 310 may classify an HTTP request according to a session ID set in a prescribed field of that HTTP request. Alternatively, the detection unit 310 may classify an HTTP request according to a session ID added to the end of a destination URL of that HTTP request.

Next, the detection unit 310 eliminates any request including a command other than the GET command or the POST command from the respective parts of the classified history (S1520). Further, the detection unit 310 eliminates the response corresponding to the eliminated request.

Next, the detection unit 310 selects any response of HTML data from the respective parts of the classified history (S1530). This is implemented by selecting any HTTP response having the Content-Type field set as "text/html". Then, the detection unit 310 eliminates the request corresponding to the response other than the selected responses. This can eliminate the request for an image constituting a part of a screen or the like.

Next, the detection unit 310 selects any response having a status code indicating error or invalidity from the respective parts of the classified history (S1540). Then, the detection unit 310 eliminates the request corresponding to the selected response from the history.

The detection unit 310 then detects, from the history classified into sessions and having the unnecessary portions eliminated based on the above-described conditions, any communication sequence that appears with a frequency equal to or greater than a predetermined reference frequency (S1550). For example, the detection unit 310 sequentially scans the communication history in time series from the beginning, and detects a plurality of communication sequences having the longest match. Specifically, for example in the case where the transition of screens 1, 2, 3 and 4 and the transition of screens 5, 1, 2 and 3 are included in the history, the communication sequences causing the transition of the screens 1, 2 and 3 corresponding to the longest portion out of the common portion are detected.

It is noted that the communication sequence that appears with a frequency equal to or greater than the reference frequency but that has the number of transiting screens smaller than a reference number may be eliminated from the target of detection, because such a communication sequence would not be very convenient even if automated. Rather, detecting such a communication sequence as well would increase the number of detected communication sequences too much, thereby rendering a more important communication sequence inconspicuous.

FIG. 16 shows an example of the screen 106X displayed on the web browser 106 in S1450. The setting unit 350 displays the communication sequences detected by the detection unit 310 on the screen 106X as a list. Specifically, the setting unit 350 may display, for each communication sequence, an identification number (ID), thumbnail images of the transiting screens, the number of requests included in the communication sequence, and the frequency of detection.

In addition, the setting unit 350 accepts an input as to whether to generate a program for reproducing each of the communication sequences. For example, the right-most column on the screen 106X has a hyperlink for generation of the program. When the user clicks on the hyperlink, generation of the program for reproducing the corresponding communication sequence is started. The screen 106X in that case is shown in FIG. 17.

FIG. 17 shows an example of the screen 106X displayed on the web browser 106 in S1460. As shown in the upper part of the screen 106X, the generating unit 360 accepts an input of the program name from the user. The program name input here is stored in the storage device 104 in association with the program generated. Additionally, the generating unit 360 may accept an input of explanation of the program from the user and store the explanation in the storage device 104 in association with the program.

Further, the setting unit 350 accepts inputs of settings for various input parameters at the center to the lower part of the screen 106X. The input parameters displayed here include those selected by the first selection unit 320 or the second selection unit 330, or those checked by the match determination unit 340.

For example, the input parameter of No. 1 indicates the input parameter selected by the first selection unit 320. For this, the setting unit 350 displays the ID of the input parameter, and the parameter values set for this input parameter in the history. Here, "name" is displayed as the ID and "vh001, vh002, vh003" are displayed as the parameter values.

This input parameter corresponds to the input parameter "name" set in the above-described request 50C shown in FIG. 9, for example. When different parameter values such as "vh001, vh002, vh003" are set for this "name" in the respective communication sequences, the setting unit 350 provides such a display as shown in the screen 106X to indicate the same.

In addition, the setting unit 350 performs setting as to whether to cause the input accepting unit 370 to accept an input of a new parameter value to be set for the input parameter, based on a user's instruction. This is implemented via a radio button in the right-most column on the screen 106X, for example. When the radio button for "variable parameter" is selected, the input accepting unit 370 accepts an input of the new parameter value to be set for the input parameter in accordance with the operation of the program based on the setting.

In this case, the setting unit 350 further accepts inputs of the label name and explanation to be set for the input parameter. The label name and the explanation input here may be displayed for guidance of inputs by the user during execution of the communication sequence by the input accepting unit 370.

On the other hand, in the case where the radio button for "fixed parameter" is selected, the setting unit 350 does not accept an input of the new parameter value to be set for the input parameter. In this case, the setting unit 350 may accept an input of the fixed parameter to be set for the input parameter. For example, a character string input in the input box displayed corresponding to the radio button for "fixed parameter" may be set as the fixed parameter. In this case, the input accepting unit 370 sets this fixed parameter to the input parameter selected by the first selection unit 320, for execution of the communication sequence.

The input parameter of No. 2 collectively indicates a plurality of input parameters selected by the second selection unit 330. For this, the setting unit 350 displays the IDs of the respective input parameters and the parameter value set commonly for these input parameters in the history. Here, "name, id, param" and "term002" are displayed as the IDs and the parameter value, respectively, indicating that the parameter value "term002" was set commonly for the parameters "name", "id" and "param".

The setting unit 350 performs setting as to whether to group the input parameters together, according to a user's instruction. This is implemented via the right-most column in the screen 106X, for example. That is, in the case where the radio button for "YES" is selected, the setting unit 350 groups the input parameters together. When this setting is effected, the input accepting unit 370 accepts an input of the parameter value to be set commonly for the input parameters during execution of the communication sequence. In this case, the input accepting unit 370 may display the label name and explanation input to the screen 106X, similarly as in the above-described example of the parameter of No. 1.

The input parameter of No. 3 indicates the parameter that is checked by the match determination unit 340 and determined to match the parameter included in the response. For this, the setting unit 350 displays the ID of the parameter set in the response, the ID of the parameter set in the request transmitted after that response, and the parameter value set commonly for these parameters.

In the example of the screen 106X, "secure id", "auth id" and "323564" are displayed as the response-side ID, the request-side ID, and the common parameter value, respectively. The setting unit 350 then accepts an input as to whether the parameter value set for the parameter corresponding to the response-side ID should be set as the parameter value for the parameter corresponding to the ID of the subsequent request as it is, during reproduction of the communication sequence.

This is implemented via the right-most column in the screen 106X. That is, in the case where the radio button for "YES" is selected, the setting unit 350 allows the parameter value set for the response to be set for the request during reproduction of the communication sequence. In contrast, when the radio button for "NO" is selected, the setting unit 350 does not allow the parameter value set for the response to be set for the request during reproduction of the communication sequence.

In this case, the setting unit 350 causes the input accepting unit 370 to accept an input of the parameter value to be set for the request during reproduction of the communication sequence. At this time, the label name and explanation input to the screen 106X may be displayed on the screen 106Y, like the above example.

In addition to the above-described settings of the input parameters, the setting unit 350 may perform setting to interrupt automatic execution of the communication sequence. Specifically, the setting unit 350 may designate interruption of the automatic execution of the communication sequence on the screen related to the input parameter, through an option for No. 1 on the screen 106X. The screen at which automatic execution will be interrupted may be designated by the screen number counted from the first one, or by the URL of the relevant screen. Based on such an input, the setting unit 350 sets one of the screens included in the screen transition by the communication sequence executed by the execution unit 380 at which the transition will be interrupted temporarily.

In response to an operation of the "enter" button, the generating unit 360 generates a program reflecting the above-described settings and stores it in the storage device 104. This program includes at least a plurality of requests to be sequentially transmitted for reproduction of the communication sequence and an instruction to accept an input of a new parameter value. An example of the flow of the processing carried out by the input accepting unit 370 and the execution unit 380 based on this program is shown in FIG. 18.

Figure 18:
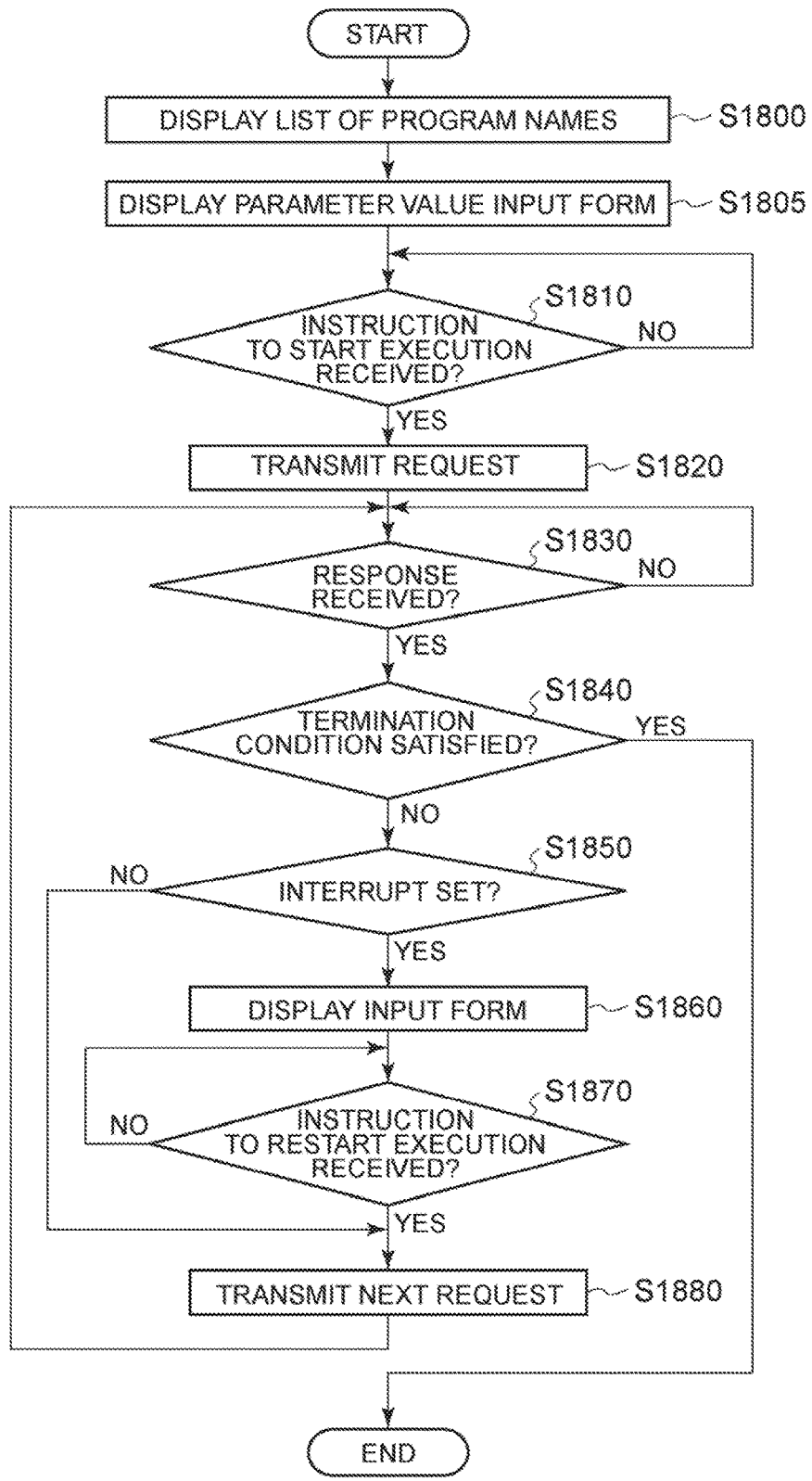
FIG. 18 shows a flow of the processing in which the agent system 108 of the embodiment carries out operations on behalf of the user based on the user's instruction.

FIG. 18 shows a flow of the processing in which the agent system 108 according to the present embodiment performs the operations on behalf of the user based on an instruction of the user. The client computer 100 or another client computer reads program names from a storage device such as the storage device 104 and displays them in the form of a list (S1800). When the user designates one of the program names, it reads the program corresponding to the designated program name from the storage device and executes the same to perform the following processing.

Firstly, the input accepting unit 370 displays a form for accepting an input of a new parameter value on the web browser 106 (S1805). The form may be displayed together with the label name and the explanation set by the setting unit 350. When an interrupt of the communication sequence has been set, the input accepting unit 370 accepts an input of the parameter value to be set for the request being transmitted before the interrupt, while it does not accept an input of the parameter value to be set for the request being transmitted after restart.

On the condition that an instruction to start execution of the communication sequence is received (YES in S1810), the execution unit 380 transmits a first request (S1820). In the request, a newly accepted parameter value may be set as appropriate.

On the condition that a response to the request is received (YES in S1830), the execution unit 380 determines whether a predetermined termination condition is satisfied (S1840). The termination condition may include one for normal termination and one for abnormal termination due to occurrence of an error. The termination condition for the normal termination is that transmission of all the requests included in the communication sequence is finished.

The termination condition for the abnormal termination due to occurrence of an error may be as follows. The execution unit 380 determines whether a response having the status code indicating error or invalidity has been received during execution of the communication sequence. When such a response is received, the execution unit 380 terminates the processing in FIG. 18, determining that the termination condition for the abnormal termination due to occurrence of an error has been satisfied.

Further, the execution unit 380 may compare the response received during execution of the communication sequence with the response included in the history for determination of occurrence of an error. As a result, if they match except for the parameter values, it continues execution of the communication sequence, whereas if they do not match, it may determine that an error occurred in the communication sequence. To this end, it is desirable that the program includes the responses stored as the history.

When the termination condition is not satisfied (NO in S1840), the execution unit 380 determines whether communication corresponding to the transition to the screen set for the interruption by the setting unit 350 has been performed (S1850). For the determination as to whether such communication has been performed, for example, the number of times of screen transition set by the setting unit 350 may be compared with the number of requests transmitted by the execution unit 380.

On the condition that such communication has been performed (YES in S1850), execution of the communication sequence is interrupted, and the input accepting unit 370 displays an input form for accepting an input of a new parameter value to be set for each request included in the communication sequence after restart (S1860). In this case, the necessary part of the response received immediately before may be displayed as well.

Then, on the condition that an instruction to restart the communication is received (YES in S1870), the execution unit 380 restarts the communication sequence by setting the new parameter value input to the input form. Specifically, the execution unit 380 transmits a next request yet to be processed (S1880). Thereafter, the process returns to S1830, and the communication sequence is continuously carried out until the termination condition is satisfied.

Figure 19:
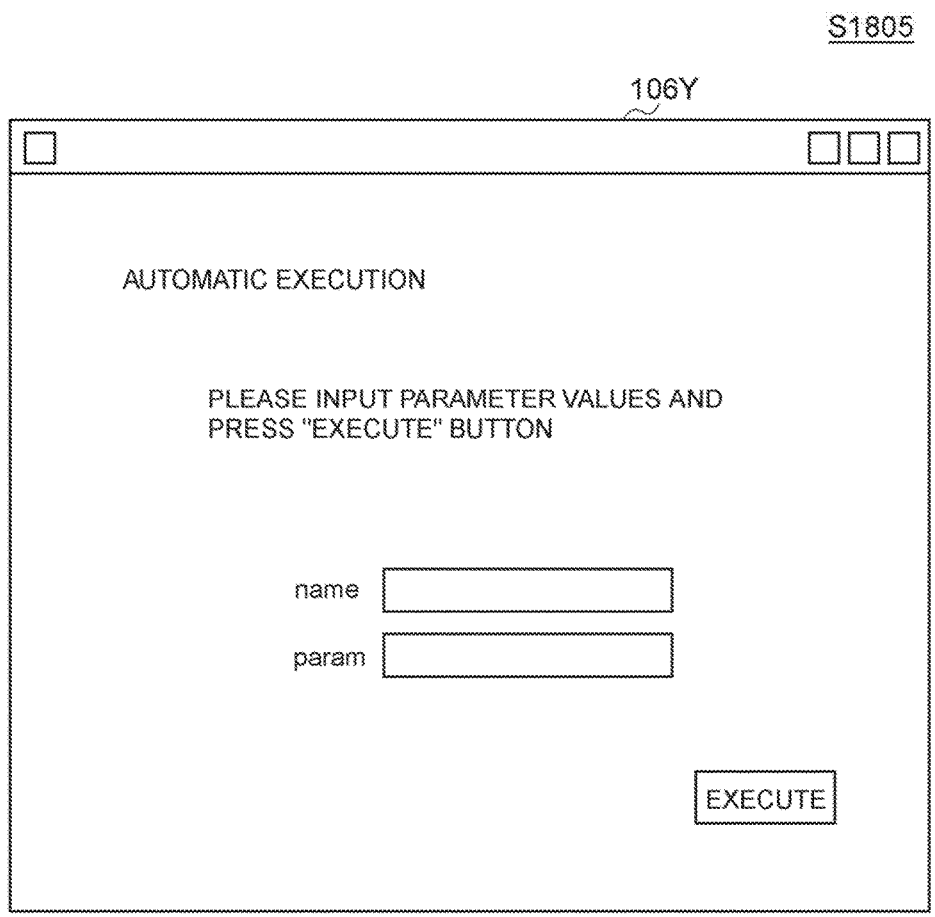
FIG. 19 shows an example of a screen 106Y displayed on the web browser 106 in S1805.

FIG. 19 shows an example of the screen 106Y displayed on the web browser 106 in S1805. The input accepting unit 370 displays the label name such as "virtual host name" or "Web module name" in association with the input field of the parameter value. The execution unit 380 then executes the communication sequence in response to an operation of the "execute" button. At this time, the parameter value input to the input field is set for the request.

Figure 20:
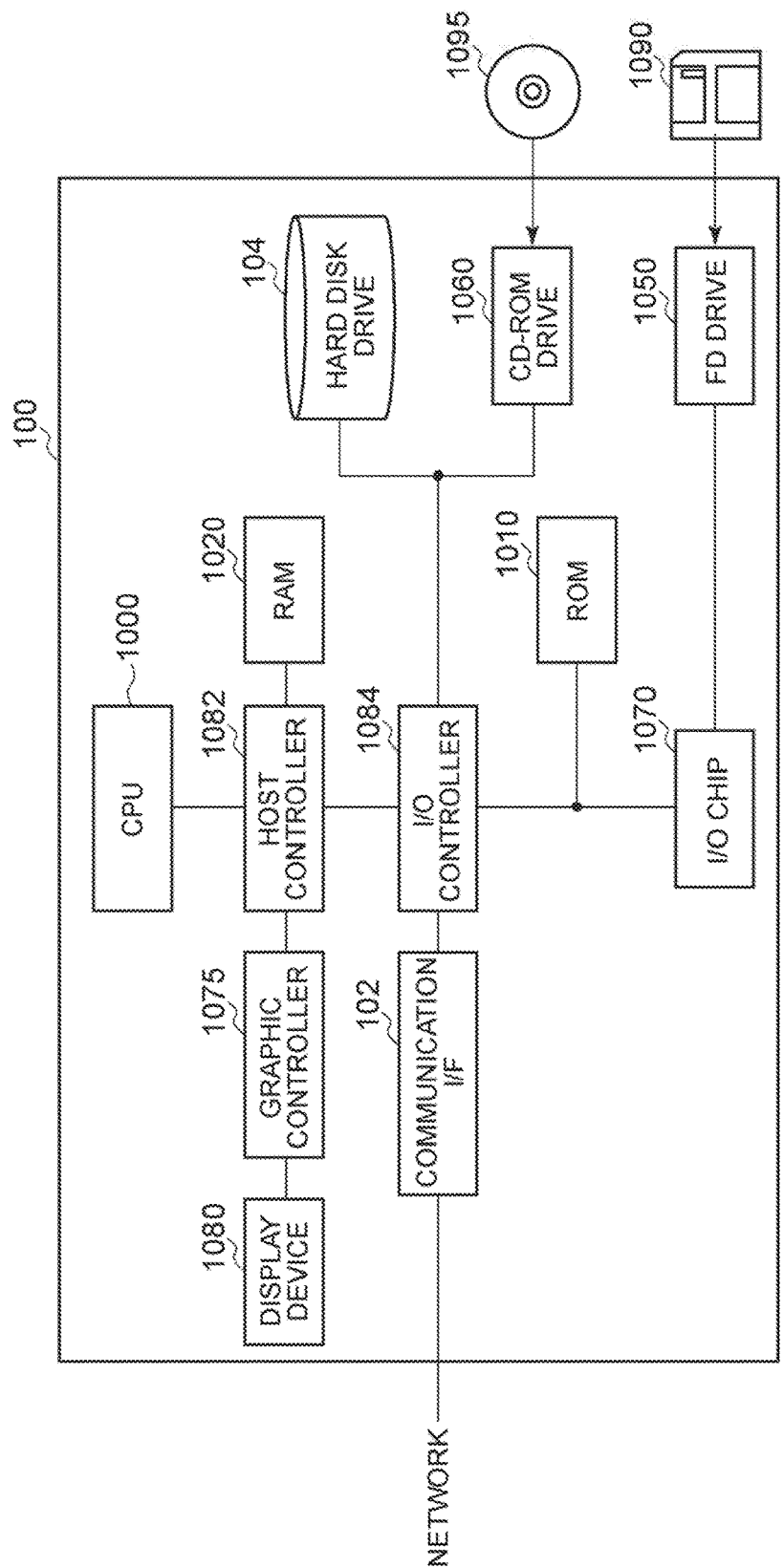
FIG. 20 shows an example of the hardware configuration of the client computer 100 according to the embodiment.

FIG. 20 shows an example of the hardware configuration of the client computer 100 according to the present embodiment. The client computer 100 includes: a CPU peripheral portion having a CPU 1000, a RAM 1020 and a graphic controller 1075 connected to each other via a host controller 1082; an input/output portion having a communication interface 102, a hard disk drive 104 and a CD-ROM drive 1060 connected to the host controller 1082 via an input/output controller 1084; and a legacy input/output portion having a ROM 1010, a flexible disk drive 1050 and an input/output chip 1070 connected to the input/output controller 1084.

The host controller 1082 connects the RAM 1020 with the CPU 1000 and the graphic controller 1075 which access the RAM 1020 at a high transfer rate. The CPU 1000 operates based on the programs stored in the ROM 1010 and the RAM 1020 for control of the respective portions. The graphic controller 1075 acquires image data generated by the CPU 1000 or the like on a frame buffer provided in the RAM 1020, for display on the display device 1080. Alternatively, the graphic controller 1075 may include therein a frame buffer for storing the image data generated by the CPU 1000 or the like.

The input/output controller 1084 connects the host controller 1082 with the communication interface 102, the hard disk drive 104 and the CD-ROM drive 1060 which are relatively fast input/output devices. The communication interface 102 communicates with an external device via a network. The hard disk drive 104 stores the program and data used by the client computer 100. The CD-ROM drive 1060 reads the program or the data from the CD-ROM 1095 and provides the same to the RAM 1020 or the hard disk drive 104.

Further, the input/output controller 1084 is connected with the ROM 1010 and the relatively slow input/output devices such as the flexible disk drive 1050 and the input/output chip 1070. The ROM 1010 stores a boot program executed by the CPU 1000 at the time of activation of the client computer 100 and a program dependent on the hardware of the client computer 100. The flexible disk drive 1050 reads a program or data from the flexible disk 1090 and provides the same to the RAM 1020 or the hard disk drive 104 via the input/output chip 1070. The input/output chip 1070 establishes connection with the flexible disk 1090, and with various input/output devices via interface ports such as a parallel port, serial port, keyboard port, and mouse port.

The program provided to the client computer 100 is stored in a recording medium such as the flexible disk 1090, the CD-ROM 1095 or an IC card, and provided by the user. The program is read from the recording medium and installed to the client computer 100 for execution, via the input/output chip 1070 and/or the input/output controller 1084. The operations the program works on and causes the client computer 100 or the like to do are identical to those of the client computer 100 explained in conjunction with FIGS. 1-19 above, and thus, description thereof will not be repeated.

The program described above may be stored in an external storage medium, which may be, besides the flexible disk 1090 and the CD-ROM 1095, an optical recording medium such as a DVD or a PD, a magneto-optical recording medium such as an MD, a tape medium, or a semiconductor memory such as an IC card. Further, a hard disk provided in a server system connected to a dedicated communication network or the Internet, or a storage device such as a RAM may be used as the recording medium, and the program may be provided to the client computer 100 via the network.

As described above, according to the client computer 100 of the present embodiment, a communication sequence that appears frequently in the communication history in the past may be selected and reproduced to automate a series of operations performed on a plurality of screens, to alleviate the load of the user. Further, the client computer 100 detects a parameter that is changed for each communication sequence and parameters for which the same parameter value is set, to set them as the input parameters upon automatic execution of the communication sequence. In this manner, it is possible to reproduce not only the operations exactly the same as those in the communication sequence included in the history, but also the operations changed as necessary upon automatic execution, to improve usability for the user. Furthermore, the communication sequence to be executed may be adjusted more meticulously through interruption of the automatic execution or various settings therefor.

While the present invention has been described with reference to the embodiment, the description of the embodiment does not restrict the technical scope of the present invention. It is apparent to those skilled in the art that various modifications and improvements are possible for the above-described embodiment. It is evident from description of the claims that the embodiments modified or improved are also within the technical scope of the present invention.

What is claimed is:

1. A system comprising a hardware processor to execute an instruction to:
   acquire a history of communication of a client computer with a server computer in receipt of an operation from a user;
   detect from the history a plurality of communication sequences that cause a screen transition of common occurrence on the client computer, wherein one or more communication sequences of the plurality is to be detected which is to appear a number of times among at least two sequences of screen transitions to cause the screen transition of common occurrence including a number of screens that transition, wherein the number of times is to include at least two, and wherein the number of screens is to include a longest portion out of a common portion among the at least two sequences of screen transitions;
   select an input parameter that is included in communication sequences of the plurality and that has a value changed;
   accept an input of a new parameter value to be set as a parameter value of the selected input parameter;
   set the new parameter value to the selected input parameter; and
   execute a communication sequence that causes the screen transition of common occurrence.

2. The system according to claim 1, wherein a hardware processor is to execute an instruction to:
   select, for at least one communication sequence of the plurality, a plurality of input parameters having a same parameter value;
   accept the input of the new parameter value to be set commonly for the plurality of input parameters; and
   set the accepted new parameter value to each of the plurality of input parameters for execution of the at least one communication sequence.

3. The system according to claim 1, wherein a hardware processor is to execute an instruction to:
   acquire, as the history, a request that the client computer transmits to the server computer and a response that the server computer returns to the client computer in response to the request;
   determine, for at least one communication sequence of the plurality, whether a parameter value of a first parameter included in a first response matches a parameter value of a second parameter included in a second request transmitted later than the first response; and
   on the condition that the parameter values of the first and second parameters match, cause the parameter value of the first parameter received as a part of the first response to be set to the second parameter included in the second request transmitted later than the first response during execution of the at least one communication sequence.

4. The system according to claim 1, wherein a hardware processor is to execute an instruction to accept the input of the new parameter value to be set for the selected input parameter based on an instruction from the user.

5. The system according to claim 1, wherein a hardware processor is to execute an instruction to:
   in the case of not accepting the input of the new parameter value to be set for the selected input parameter, set a fixed parameter to be set for the selected input parameter based on an instruction from the user; and
   set the fixed parameter to the selected input parameter for execution of the communication sequence.

6. The system according to claim 1, wherein a hardware processor is to execute an instruction to:
   display a form to accept the input of the new parameter value on a web browser operating in the client computer; and
   set the new parameter value input to the form to the selected input parameter in accordance with an instruction of the user for execution of the communication sequence.

7. The system according to claim 1, wherein a hardware processor is to execute an instruction to:
   accept an input of a program name from the user and store a program in association with the input program name; and read the program corresponding to the program name designated by the user for execution.

8. The system according to claim 1, wherein a hardware processor is to execute an instruction to:
set, based on an instruction from the user, a screen at which a screen transition by the communication sequence executed is to be interrupted;
interrupt execution of the communication sequence on the condition that communication corresponding to transition to the screen is performed during the execution of the communication sequence;
when the execution of the communication sequence is interrupted, accept an input of a new value to be used for a parameter in the communication after restart; and
on the condition that the input of the new value is accepted, set the new value and restart the communication sequence.

9. The system according to claim 1, wherein a hardware processor is to execute an instruction to classify the history into communication sessions, and for each classified session, detect one or more communication sequences of the plurality which is to appear with a frequency equal to or greater than a reference frequency of occurrence.

10. The system according to claim 9, wherein the communication sequence is to include a request and a response in HTTP (Hypertext Transfer Protocol), wherein the screen transition is to include a plurality of web pages displayed sequentially, and wherein a hardware processor is to execute an instruction to:
acquire, as the history, a request that the client computer transmits to the server computer and a response that the server computer returns to the client computer in response to the request; and
select any request corresponding to a response of HTML data from among the history, and detect one or more communication sequences of the plurality which is to appear with a frequency equal to or greater than a reference frequency of occurrence from among sequences of requests selected.

11. The system according to claim 10, wherein a hardware processor is to execute an instruction to eliminate from the history any request corresponding to a response having a status code indicating error or invalidity, and detect one or more communication sequences which is to appear with a frequency equal to or greater than a reference frequency of occurrence from among remaining sequences of the requests.

12. The system according to claim 1, wherein a hardware processor is to execute an instruction to stop the execution of the communication sequence on the condition that a response having a status code indicating error or invalidity is received during the execution of the communication sequence.

13. The system according to claim 12, wherein a hardware processor is to execute an instruction to cause the execution of the communication sequence to be continued on the condition that the response received during the execution of the communication sequence matches a response included in the history except for the parameter value.

14. The system according to claim 1, wherein a hardware processor is to execute an instruction to eliminate from a target of detection a communication sequence that causes a number of screens to transition which is smaller than a reference number.

15. A computer program product comprising:
a non-transitory computer readable storage medium; and
computer usable code stored on the computer readable storage medium, where, when executed by a processor, the computer usable code causes a computer to:
acquire a history of communication of a client computer with a server computer in receipt of an operation from a user;
detect from the history a plurality of communication sequences that cause a screen transition of common occurrence on the client computer, wherein one or more communication sequences of the plurality is to be detected which is to appear a number of times among at least two sequences of screen transitions to cause the screen transition of common occurrence including a number of screens that transition, wherein the number of times is to include at least two, and wherein the number of screens is to include a longest portion out of a common portion among the at least two sequences of screen transitions;
select an input parameter that is included in communication sequences of the plurality and that has a value changed;
accept an input of a new parameter value to be set as a parameter value of the selected input parameter;
set the new parameter value to the selected input parameter; and
execute a communication sequence that causes the screen transition of common occurrence.

16. The program product of claim 15, wherein the computer usable code, when executed, further causes a computer to detect one or more communication sequences of the plurality which is to appear a number of times within a period of time to cause a screen transition of common occurrence.

17. The program product of claim 15, wherein the computer usable code, when executed, further causes a computer to eliminate from a target of detection a communication sequence that causes a number of screens to transition which is smaller than a reference number.

18. A method comprising:
acquiring a history of communication of a client computer with a server computer in receipt of an operation from a user;
detecting from the history a plurality of communication sequences that cause a screen transition of common occurrence on the client computer, wherein one or more communication sequences of the plurality is detected which appears a number of times among at least two sequences of screen transitions to cause the screen transition of common occurrence including a number of screens that transition, wherein the number of times includes at least two, and wherein the number of screens includes a longest portion out of a common portion among the at least two sequences of screen transitions;
selecting an input parameter that is included in communication sequences of the plurality and that has a value changed;
accepting an input of a new parameter value to be set as a parameter value of the selected input parameter;
setting the new parameter value to the selected input parameter; and
executing a communication sequence that causes the screen transition of common occurrence.

19. The method of claim 18, further including detecting one or more communication sequences of the plurality which appears a number of times within a period of time to cause a screen transition of common occurrence.

20. The method of claim 18, further including eliminating from a target of detection a communication sequence that causes a number of screens to transition which is smaller than a reference number.

* * * * *